United States Patent
Colliver et al.

(10) Patent No.: US 8,003,153 B2
(45) Date of Patent: Aug. 23, 2011

(54) GREEN LEAF TEA PRODUCT AND A PROCESS FOR THE MANUFACTURE THEREOF

(75) Inventors: Steven Peter Colliver, Sharnbrook (GB); Peter Kiprotich Ngeno, Kericho (KE); Ambalavanar Thiru, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 213 days.

(21) Appl. No.: 11/973,130

(22) Filed: Oct. 5, 2007

(65) Prior Publication Data

US 2008/0085356 A1 Apr. 10, 2008

(30) Foreign Application Priority Data

Oct. 6, 2006 (EP) .................................... 06121924

(51) Int. Cl.
*A23F 3/00* (2006.01)

(52) U.S. Cl. ....... 426/597; 426/52; 426/435; 426/330.5; 426/541; 426/433; 426/471; 424/59

(58) Field of Classification Search ................. 426/597, 426/52, 435, 330.5, 541, 433, 471
See application file for complete search history.

(56) References Cited

U.S. PATENT DOCUMENTS

| | | | | |
|---|---|---|---|---|
| 6,632,462 B2 * | 10/2003 | Blair et al. | ...................... | 426/49 |
| 2003/0077373 A1 * | 4/2003 | Blair et al. | ...................... | 426/597 |
| 2005/0095343 A1 * | 5/2005 | Ogura et al. | ................... | 426/597 |
| 2005/0287278 A1 * | 12/2005 | Quan et al. | ..................... | 426/597 |
| 2006/0147603 A1 * | 7/2006 | Otsuka et al. | ................. | 426/597 |

FOREIGN PATENT DOCUMENTS

| | | | |
|---|---|---|---|
| CN | 1391820 A | * | 7/2002 |
| EP | 1 202 635 A | | 2/2005 |
| GB | 00921 A | | 11/1907 |
| GB | 0 139 439 A | | 3/1920 |
| GB | 0 856 568 A | | 12/1960 |
| GB | 1 099 758 A | | 1/1968 |
| GB | 1 175 559 A | | 12/1969 |
| GB | 1 274 783 A | | 5/1972 |
| GB | 1 329 612 A | | 9/1973 |
| GB | 2 024 599 A | | 1/1980 |
| WO | 01/11979 | | 2/2001 |
| WO | 02/071855 | | 9/2002 |

OTHER PUBLICATIONS

Harler, C.R., Tea Manufacture, 1963, Oxford University Press, pp. 13-14, 70-74.*
Harler, C.R., Tea Manufacture, 1963, Oxford University Press, p. 51-52.*

(Continued)

*Primary Examiner* — Jennifer C McNeil
*Assistant Examiner* — Hong Mehta
(74) *Attorney, Agent, or Firm* — Ellen Plotkin

(57) ABSTRACT

A palatable green leaf tea from *Camellia sinensis* var. *assamica* is disclosed. Infusion of 2 g of the leaf tea in 200 ml water for 1.5 minutes at 90° C. produces a beverage comprising catechins in an amount of between 0.01 and 0.1% by weight of the beverage. Also disclosed is a process for manufacturing the leaf tea product wherein fresh leaf from var. *assamica* is macerated using a combination of a rotorvane and double-cone processor.

7 Claims, 1 Drawing Sheet

OTHER PUBLICATIONS

Patanker, M.R., Food Preparation: A Scientific Approach. 2001, pp. 152.*

Partial European Search Report on Application No. EP 06 12 1924 dated Dec. 22, 2006.

Patent Abstract of Japan for Publication No. 58220652 dated Dec. 1983.

Patent Abstract of Japan for Publication No. 08080157 dated Sep. 1994.

Patent Abstract of Japan for Publication No. 2001245591 dated Mar. 2000.

Patent Abstract of Japan for Publication No. 07-322822 dated Dec. 1995.

"Tea: Cultivation to Consumption", K.C. Willson and M.N. Clifford (Eds), $1^{st}$ Edn, 1992, Chapman & Hall (London), Chapter 13 and pp. 486-487.

Pursuant to MPEP § 2001.6(b) applicants bring the following *co-pending application* to the Examiner's attention: Applicant: Colliver, et al. Case No. F3431(C), U.S. Appl. No. 11/651,284, filed Jan. 9, 2007 For: Method for the Manufacture of a Green Tea Product.

Pursuant to MPEP § 2001.6(b) applicants bring the following *co-pending application* to the Examiner's attention: Applicant: Colliver, et al. Case No. F3420(C), U.S. Appl. No. 11/880,795, filed Jul. 24, 2007 For: Beverage Precursor and Process for the Manufacture Thereof.

Observations of Opposition by Allied Patents B.V. against EP 1 886 515 B1, dated Jul. 15, 2009, 5 pp.

* cited by examiner

GREEN LEAF TEA PRODUCT AND A PROCESS FOR THE MANUFACTURE THEREOF

TECHNICAL FIELD OF THE INVENTION

The present invention relates to green leaf tea.

BACKGROUND OF THE INVENTION

Green tea is a popular beverage which has been consumed in China and Japan for many hundreds of years. Recently, extensive laboratory research and epidemiologic studies have shown that compounds present in green tea (particularly the flavanols such as catechins) may reduce the risk of a variety of illnesses. These studies, along with the increasing complexity of the consumer's palate have led to increased consumption of green tea, even in markets (such as the USA and Western Europe) where there is no tradition of green tea consumption.

There are two varieties of the tea plant *Camellia sinensis*, namely var. *sinensis* and var. *assamica*. The variety *Camellia sinensis* var. *assamica* typically has the highest catechin content and is also relatively rich in certain non-flavanol actives, such as the amino acid theanine.

The flavanols have a large influence on the bitterness and astringency of tea infusions. Thus, owing to the high flavanol content of var. *assamica*, infusions of green tea from this variety are found to be unpalatably bitter. Consequently, var. *assamica* is considered unsuitable for use in green tea production (see, for example, "Tea: Cultivation to Consumption", K. C. Willson and M. N. Clifford (Eds), 1$^{st}$ Edn, 1992, Chapman & Hall (London), Chapter 13, p. 414).

We have recognised that there is a need to provide a green leaf tea that has the enhanced levels of actives typical of var. *assamica* but which produces a beverage having the palatability of traditional green tea beverages prepared from var. *sinensis*. We have found that such a need may be met by controlling the amount of catechins delivered by the green leaf tea.

TESTS AND DEFINITIONS

Figure 1:
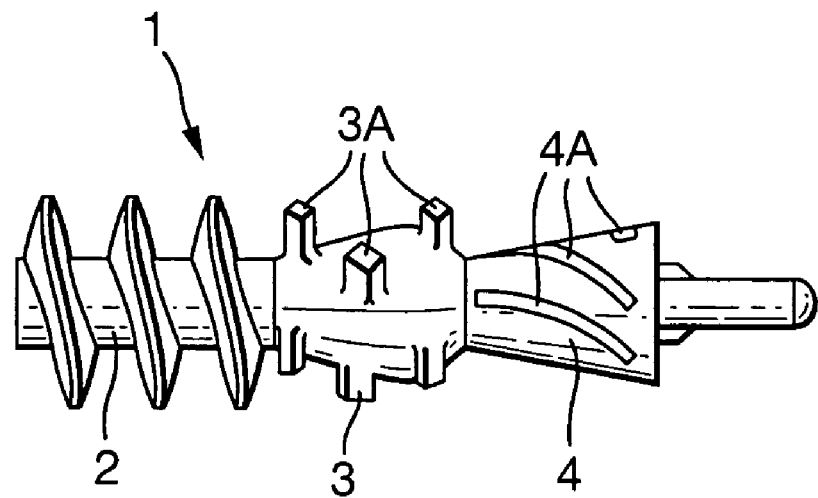
FIG. 1 shows an elevation of the rotor of a double-cone processor.

Tea "Tea" for the purposes of the present invention means material from *Camellia sinensis* var. *sinensis* and/or *Camellia sinensis* var. *assamica*.

"Leaf tea" for the purposes of this invention means a tea product that contains tea leaves and/or stem in an uninfused form, and that has been dried to a moisture content of less than 30% by weight, and usually has a water content in the range 1 to 10% by weight (i.e. "made tea"). "Green leaf tea" refers to substantially unfermented leaf tea. "Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances.

"Fresh tea leaves" refers to tea leaves and/or stem that have never been dried to a water content of less than 30% by weight, and usually have a water content in the range 35 to 90%.

Beverage

As used herein the term "beverage" refers to a substantially aqueous drinkable composition suitable for human consumption.

Production of a Beverage by Infusion 2 g Leaf Tea in 200 ml Water at 90° C. for 1.5 Minutes For the purposes of this invention, the ability of leaf tea to deliver actives such as catechins, caffeine and/or theanine, as well as the ability of the leaf tea to deliver beverages with good colour and/or clarity is determined using the following standard infusion conditions:

1. The leaf tea is removed from any package and 2 g is placed in a 500 ml container.
2. 1 liter of deionised water is then brought to boiling and 200 g immediately added to the 500 ml container.
3. The container is stored at an air temperature of 20° C. and the leaf tea is allowed to statically infuse in the water.
4. After 1.5 minutes, the infusion is stirred for 5 s by hand using a spoon and the leaf tea is then immediately removed from the infusion by straining the contents of the container through muslin.

Catechins

As used herein the term "catechins" is used as a generic term for catechin, gallocatechin, catechin gallate, gallocatechin gallate, epicatechin, epigallocatechin, epicatechin gallate, epigallocatechin gallate, and mixtures thereof.

Determination of Catechins and Caffeine in Leaf Tea

The amounts of catechins and caffeine in leaf tea are determined simultaneously by reverse-phase HPLC as follows:

Sample Preparation

1. Grind leaf tea using a Cyclotech™ 1093 sample mill (FOSS Ltd, Warrington, Cheshire, UK) fitted with a 1.0 μm screen, until a fine powder is achieved.
2. Weigh accurately approximately 200 mg of the ground leaf tea into an extraction tube, and record the mass.
3. Warm at least 20 ml of a methanol-water solution (70% v/v methanol in distilled water) to 70° C.
4. Add 5 ml of the hot methanol-water solution to the extraction tube. Gently mix the methanol-water and leaf tea on a vortex mixer; place in a water bath at 70° C. for 5 minutes; mix again and then place in a water bath at 70° C. for a further 5 minutes.
5. Gently mix the methanol-water and leaf tea on a vortex mixer again and then allow to cool for 10 minutes at an air temperature of 20° C.
6. Centrifuge the extraction tube at a relative centrifugal force (RCF) of 2900 g for 10 minutes.
7. The extraction tube should now contain a liquid supernatant on top of a plug of tea material. Carefully decant supernatant into a clean graduated test tube.
8. Add 5 ml of the hot methanol-water solution to the plug in the extraction tube. Gently mix the methanol-water and tea material on a vortex mixer; place in a water bath at 70° C. for 5 minutes; mix again and then place in a water bath at 70° C. for a further 5 minutes.
9. Gently mix the methanol-water and tea material on a vortex mixer again and then allow to cool for 10 minutes at an air temperature of 20° C.
10. Centrifuge the extraction tube at a RCF of 2900 g for 10 minutes.
11. The extraction tube should now contain a liquid supernatant on top of a plug of tea material. Carefully decant supernatant into the graduated test tube containing the supernatant from step 7.
12. Make up the pooled supernatants to 10 ml with the methanol-water solution.

13. Add 1 ml of a solution of 2.5 mg/ml EDTA and 2.5 mg/ml ascorbic acid in distilled water to the graduated test tube.

14. Dilute 1 part of the pooled supernatant mixture with 4 parts (by volume) of 10% acetonitrile stabiliser solution (10% v/v acetonitrile, 0.25 mg/ml ascorbic acid and 0.25 mg/ml EDTA in distilled water).

15. Decant the diluted pooled supernatant mixture into microcentrifuge tubes and centrifuge in a bench top centrifuge at a RCF of 14000 g for 10 minutes.

HPLC Analysis Conditions

| Column: | Luna Phenyl hexyl 5µ, 250 × 4.60 mm |
| --- | --- |
| Flow rate: | 1 ml/min |
| Oven temperature: | 30° C. |
| Solvents: | A: 2% acetic acid in acetonitrile |
| | B: 2% acetic acid and 0.02 mg/ml EDTA in water |
| Injection volume: | 10 µl |

Gradient:

| Time | % Solvent A | % Solvent B | Step |
| --- | --- | --- | --- |
| 0 to 10 min | 5 | 95 | Isocratic |
| 10 to 40 min | 5-18 | 95-85 | Linear gradient |
| 40 to 50 min | 18 | 82 | Isocratic |
| 50 to 55 min | 50 | 50 | Wash |
| 55 to 75 min | 5 | 95 | Isocratic |

Quantification: Peak area relative to a calibration curve constructed daily. Calibration curve is constructed from caffeine and the concentration of catechins is calculated using the relative response factors of the individual catechins to caffeine (from the ISO catechin method—ISO/CD 14502-2). Individual caffeine standards (Sigma, Poole, Dorset, UK) are used as peak identification markers.

Determination of Catechins and Caffeine in a Beverage

The amounts of catechins and caffeine in a beverage are determined simultaneously by reverse-phase HPLC as follows:

Sample Preparation 1. 9 ml of the freshly-brewed beverage are taken and 1.12 ml of acetonitrile added, along with 1.12 ml of a solution of 2.5 mg/ml EDTA and 2.5 mg/ml ascorbic acid in distilled water.

2. The resulting solution is then decanted into microcentrifuge tubes and centrifuged at a RCF of 14000 g for 10 minutes.

HPLC Analysis Conditions

The HPLC analysis conditions are identical to those given above for the leaf tea.

Determination of Theanine in a Beverage

The amount of theanine in a beverage is determined by reversed phase HPLC chromatography using fluorimetric detection following post-column derivatisation with o-pthalaldehyde.

Sample Preparation

The freshly-brewed beverage is diluted with de-ionised water (25° C.) in a weight ratio of beverage:water of 1:10.

HPLC Analysis Conditions

| Column: | Hypersil HyPURITY Elite ™ C18, 5µ, 150 mm × 4.6 cm |
| --- | --- |
| Flow rate: | 1 ml/min |
| Oven temperature: | 35° C. |
| Solvents: | A: 5 mM pentadecafluorooctanoic acid in water |
| | B: 5 mM pentadecafluorooctanoic acid in acetonitrile |

Gradient:

| Time (min) | % Solvent A | % Solvent B |
| --- | --- | --- |
| 0 | 85 | 15 |
| 8 | 85 | 15 |
| 10 | 80 | 20 |
| 11 | 10 | 90 |
| 14 | 10 | 90 |
| 15 | 85 | 15 |
| 31 | 85 | 15 |

Quantification: The eluant from the column is fed into a low dead-volume 3-way junction and mixed with the o-Pthalaldehyde reagent in a 1:1 ratio, the o-Pthalaldehyde reagent being pumped at 1 ml/minute by the isocratic pump. (The o-Pthalaldehyde reagent is 1.0 g/l o-Pthalaldehyde, 5 ml/l methanol, 2 ml/l Brij 35 and 3 ml/l 2-mercaptoethanol in pH 10 borate buffer.)

Fluorescence detection is: Excitation=340 nm and Emission=425 nm. Peak area relative to a calibration curve constructed daily is used for quantification. The calibration curve is constructed from dilutions of a standard solution of Suntheanine™ (Taiyo KK)

Determination of Haze of a Beverage

The haze of a beverage is measured at 25° C. Directly following infusion, the freshly-brewed beverage is allowed to cool to 25° C. and then immediately analysed using a Hach 2100P turbidimeter (Hach Lange Ltd, Salford, UK). The 2100P is a portable turbidimeter with a tungsten filament lamp as an optical light source. Sample volume is 15 ml. The cell path length is 2 cm. Haze is reported as NTU (Nephelometric Turbidity Units).

Determination of Colour of a Beverage

The colour of a beverage is measured at 25° C. Directly following infusion, the freshly-brewed beverage is allowed to cool to 25° C. and then immediately analysed using a Minolta CT-310 transmittance color meter. The colorspace used is CIELab, the illuminant is C, and the cell path length is 10 mm. The meter is zeroed on distilled water and calibrated using a Yellow 101 filter (available from Lee Filters, Andover, UK) having: $L^*=91.44$, $a^*=-15.92$, $b^*=102.38$, $C^*=103.61$ and $h^*=98.84$; wherein $L^*$ is light-dark, $a^*$ is red-green, $b^*$ is yellow-blue, $C^*$ is chroma and $h^*$ is hue.

Particle Size

For the purposes of the present invention, particle size is characterised by sieve mesh size using the following convention:

Tyler mesh sizes are used throughout.

A "+" before the sieve mesh indicates the particles are retained by the sieve.

A "−" before the sieve mesh indicates the particles pass through the sieve.

For example, if the particle size is described as −5 +20 mesh, then the particles will pass through a 5 mesh sieve (particles smaller than 4.0 mm) and be retained by a 20 mesh sieve (particles larger than 841 µm).

Rotorvane

A rotorvane is a type of tea leaf conditioner, conventionally used to wound tea leaves prior to processing with a CTC (crush, tear and curl) machine during black tea manufacture. Rotorvanes are widely used in the tea industry and are described, for example, in "Tea: Cultivation to Consumption", K. C. Willson and M. N. Clifford (Eds), 1st Edn, 1992, Chapman & Hall (London), Chapter 14, especially pp. 486-

487. Suppliers of rotorvanes include Vkram India Ltd (Kolkata, India) and Plamac (India) Pvt Ltd (Kolkata, India).

Double-Cone Processor

A double-cone processor is a type of continuous tea leaf rolling machine. Double-cone processors are available, for example, from Plamac (India) Pvt Ltd (Kolkata, India).

Figure 2:
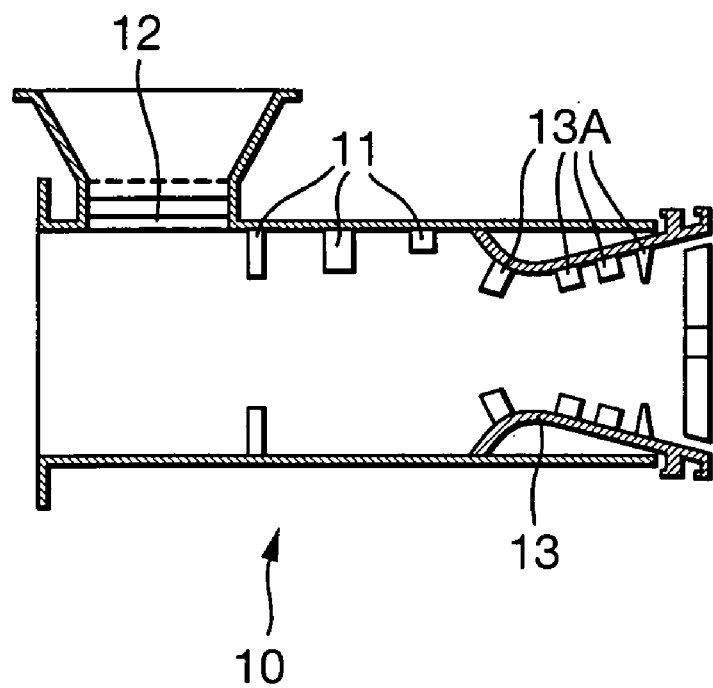
FIG. 2 shows a vertical section of the barrel of a double-cone processor.

The double-cone processor is similar to the tea processing machine disclosed in UK patent GB 1 175 559 (Peter John Parr), except that the barrel and rotor shaft are modified as shown in FIGS. 1 and 2, respectively. Specifically, the double-cone processor comprises a stationary barrel (10) having three sets of resistors (11) projecting from the inner wall of the barrel (10), an opening (12) near one end (feed end) of the barrel (10) to feed fresh tea leaves to be macerated, and a rotor shaft (1) adapted to advance the tea leaves from the feed end to the other end (discharge end) of the barrel (10) by axial rotation therein and simultaneously macerate the leaves. The rotor (1) comprises a helical feed worm (2) for part of its length near the feed end of the barrel (10), a first frusto-conical member (3) extending from the feed worm (2) and extending towards the discharge end of the barrel, and a second frusto-conical member (4) extending from the first frusto-conical member (3) to the discharge end of the barrel (10). The first frusto-conical member (3) has three sets of vanes (3A) radially projecting therefrom, the vanes (3A) being staggered in relation to the resistors (11) of the barrel wall. The second frusto-conical member (4) has its inclined surface fluted with flutes (4A) helically disposed. The discharge end of barrel (10) is fitted with a pressure sleeve (13) similar to the sleeve disclosed in GB 1 175 559, the sleeve having a plurality of studs (13A) projecting from its inner surface.

SUMMARY OF THE INVENTION

In a first aspect, the present invention provides a green leaf tea from *Camellia sinensis* var. *assamica*, wherein infusion of 2 g of the leaf tea in 200 ml water for 1.5 minutes at 90° C. produces a beverage comprising catechins in an amount of between 0.01 and 0.1% by weight of the beverage.

We have found that such a leaf tea can be used to prepare beverages at least as palatable as green tea beverages prepared from var. *sinensis*.

We have also found that a particularly convenient method of producing green leaf tea from *Camellia sinensis* var. *assamica*, which has the desired infusion properties, is by macerating fresh leaf with the combination of a rotorvane and a double-cone processor.

Thus in a further aspect, the present invention provides a process for manufacturing a green leaf tea comprising the steps of:
  (a) providing fresh tea leaves from the plant *Camellia sinensis* var. *assamica*; then
  (b) heat-treating the fresh leaves to arrest enzyme action; then
  (c) macerating the fresh leaves with a rotorvane and a double-cone processor, preferably by passing the fresh leaves through the rotorvane to produce partially macerated leaves and then passing the partially macerated leaves through the double-cone processor to produce the macerated leaves; then
  (d) drying the macerated leaves; and then
  (e) optionally sorting the dried macerated leaves according to particle size.

The present invention also provides green leaf tea obtained and/or obtainable by the process of the invention.

In a further aspect still, the present invention relates to a new leaf tea having enhanced levels of actives and/or good colour and clarity but having catechin levels typical of traditional green tea. Thus, the invention provides a green leaf tea from *Camellia sinensis* var. *assamica* and/or *sinensis* wherein infusion of 2 g of the leaf tea in 200 ml water for 1.5 minutes at 90° C. produces a beverage comprising catechins in an amount of between 0.01 and 0.1% by weight of the beverage, more preferably between 0.04 and 0.09% by weight of the beverage, most preferably from 0.06, to 0.085%.; and wherein the beverage additionally:
  comprises theanine in an amount of at least 0.004% by weight of the beverage, preferably from 0.005 to 0.02%, and/or
  has a haze of less than 20 NTU, preferably from 1 to 15 NTU, and/or
  has a hue ($h^*$) of between 103 and 115, preferably between 104 and 110, and/or
  has a chroma ($C^*$) of between 6 and 15, preferably between 8 and 10, and/or
  has a lightness ($L^*$) of between 94 and 100, preferably between 96 and 99.

DETAILED DESCRIPTION

Green Leaf Tea

We have found that green leaf tea from *Camellia sinensis* var. *assamica* can be used to produce palatable green tea beverages. We have found that if the infusion characteristics of the leaf tea are controlled such that when 2 g of the leaf tea is infused in 200 ml water for 1.5 minutes at 90° C. a beverage is produced comprising catechins in an amount of less than 0.1% by weight of the beverage, then the leaf tea is suitable for preparing palatable beverages. The bitterness of the beverages can be further reduced by decreasing the amount of catechins delivered by the leaf tea such that when 2 g of the leaf tea is infused in 200 ml water for 1.5 minutes at 90° C. a beverage is produced comprising catechins in an amount of less than 0.09% by weight of the beverage, more preferably less than 0.085%.

The leaf tea of the present invention, however, still comprises significant amounts of catechins in order to provide taste and/or health benefits associated with green tea. Thus the infusion characteristics of the leaf tea are controlled such that when 2 g of the leaf tea is infused in 200 ml water for 1.5 minutes at 90° C. a beverage is produced comprising catechins in an amount of at least 0.01% by weight of the beverage. In fact, we have found that the amount of catechins delivered by the leaf tea may be as high or even higher than even the most high quality conventional teas from *Camellia sinensis* var. *sinensis* without becoming unpalatable. Thus the infusion characteristics of the leaf tea are preferably controlled such that when 2 g of the leaf tea is infused in 200 ml water for 1.5 minutes at 90° C. a beverage is produced comprising catechins in an amount of at least 0.04% by weight of the beverage, more preferably at least 0.05% and most preferably at least 0.06%.

Despite the relatively low levels of catechins delivered by the green leaf tea, we have found that the levels of certain other actives (such as theanine and caffeine) may be delivered at relatively high levels compared with conventional leaf teas. Thus it is preferred that the green leaf tea delivers theanine such that infusion of 2 g of the leaf tea in 200 ml water for 1.5 minutes at 90° C. results in a beverage comprising theanine in an amount of at least 0.004% by weight of the beverage, more preferably from 0.005 to 0.02%, and most preferably from 0.006 to 0.01%.

Alternatively or additionally, the infusion characteristics of the leaf tea are such that when 2 g of the leaf tea is infused in 200 ml water for 1.5 minutes at 90° C. a beverage is produced comprising caffeine in an amount of at least 0.008% by weight of the beverage, more preferably at least 0.01% and most preferably from 0.012 to 0.03%.

The infusion characteristics of the green leaf tea are preferably such that the green leaf tea produces a beverage with high clarity and good colour. In particular it is preferred that the beverage produced by infusion of 2 g of the leaf tea in 200 ml water for 1.5 minutes at 90° C. has. a haze of less than 20 NTU, more preferably less than 15 NTU and most preferably from 1 to 10 NTU. Alternatively or additionally, the beverage produced by infusion of 2 g of the leaf tea in 200 ml water for 1.5 minutes at 90° C. has a hue ($h^*$) of between 103 and 115, more preferably between 104 and 110; a chroma ($C^*$) of between 6 and 15, more preferably between 8 and 10; and/or a lightness ($L^*$) of between 94 and 100, more preferably between 96 and 99.

The infusion characteristics of the leaf tea may be provided in a number of ways including, controlling the particle size of the leaf tea, controlling the catechin content of the leaf tea, and/or controlling the degree of damage to the leaf during processing.

In general, the larger the particle size of the leaf tea, the less efficient is the catechin delivery. Thus it is preferred that at least 90% by weight of the leaf tea has a particle size above 30 mesh (595 μm), more preferably above 25 mesh (707 μm) and most preferably above 20 mesh (841 μm). If the particle size is too large, however, the tea may infuse too slowly and/or become difficult to portion and handle. Thus it is preferred that at least 90% by weight of the leaf tea has a particle size below 3 mesh (5.66 mm), more preferably below 4 mesh (4.76 mm) and most preferably below 5 mesh (4.00 mm).

Although the infusion characteristics of the leaf tea may be manipulated by controlling the catechin content of the leaf tea, the processes required to achieve this (e.g. partially fermenting or extracting the leaf) would necessarily alter the taste and/or non-flavanol actives provided by the leaf tea. Accordingly it is preferred that the leaf tea retains the high catechin level typical of var. *assamica*. Thus it is preferred that the catechin content of the green leaf tea is at least 11% by dry weight of the leaf tea, more preferably at least 12% and most preferably from 13 to 20%.

The most preferred method of providing the specified infusion characteristics of the leaf tea is by controlling the degree of damage to the leaf during processing, for example by employing the process of the invention.

The Process

The process of the invention comprises the steps of:
(a) providing fresh tea leaves from the plant *Camellia sinensis* var. *assamica*; then
(b) heat-treating the fresh leaves to arrest enzyme action; then
(c) macerating the fresh leaves with a rotorvane and a double-cone processor, preferably by passing the fresh leaves through the rotorvane to produce partially macerated leaves and then passing the partially macerated leaves through the double-cone processor to produce the macerated leaves; then
(d) drying the macerated leaves; and then
(e) optionally sorting the dried macerated leaves according to particle size.

Providing Fresh Leaves

In its simplest form, the fresh tea leaves are provided in freshly plucked form, i.e. without any further processing, and have a moisture content of 76 to 80% by weight. The fresh tea leaves preferably comprise leaf and stem material. Most preferably the fresh tea leaves comprise actively growing buds, e.g. in the form of the first two or three leaves together with the unopened bud (so-called "two-and-a-bud" and/or "three-and-a-bud" material).

Heat-Treatment

The heat-treatment of the fresh leaves arrests the enzyme action in the fresh leaves. The heat treatment should be such as to inactivate those endogenous enzymes responsible for fermentation and thus should be sufficient to substantially prevent fermentation during or after maceration (step (c)). Suitable heat-treatments are well-known to those skilled in the art and include steaming and/or pan-firing (see, for example, "Tea: Cultivation to Consumption", K. C. Willson and M. N. Clifford (Eds), $1^{st}$ Edn, 1992, Chapman & Hall (London), Chapter 13). Steaming is the preferred mode of heat-treatment as this avoids scorching of the leaf surface which is sometimes encountered in contact-heating such as pan-firing. Scorching of the leaf surface can result in poor infusion characteristics of the made tea, particularly in respect of the colour and clarity of the resulting beverage.

We have found that controlling the moisture content of the fresh leaves prior to heat-treatment allows for convenient handling of the leaf in down-stream processing. In particular, it is preferred that the moisture content of the leaves is controlled to be in the range of 74 to 76% by weight. Suitably, this moisture content is achieved by partially drying the leaves.

Maceration

Maceration serves two functions. Firstly it damages the leaves such that their contents are more or less accessible to water used to make a beverage. Secondly it changes the shape and size of the leaves.

Traditionally, green tea is macerated using batch equipment known as rollers (see, for example, "Tea: Cultivation to Consumption", K. C. Willson and M. N. Clifford (Eds), $1^{st}$ Edn, 1992, Chapman & Hall (London), Chapter 13) or by rolling by hand. Green teas are also known that are macerated using continuous equipment such as CTC machines. We have found that these known processes have the disadvantage of being unsuitable for continuous manufacture or resulting in too much leaf damage to provide the desirable infusion characteristics of the made tea.

We have surprisingly found that maceration using a combination of rotorvane and double-cone processor provides the required amount of leaf damage to produce assamica green leaf tea that allows for the provision of palatable green tea beverages. In particular the leaf damage is such as to provide leaf tea that delivers the taste and actives of green tea, whilst not being too severe so as to provide the leaf tea with so high an efficiency of catechin delivery that beverages produced therefrom are unpalatably bitter. Furthermore, the resulting green leaf tea is found to have a "twisted" appearance similar to that of high quality hand-rolled teas.

The preferred arrangement is one wherein the leaves are first passed through the rotorvane and then passed through the double-cone processor. Thus in a preferred embodiment, following heat-treatment, the fresh leaves are passed through the rotorvane to produce partially macerated leaves and then the partially macerated leaves are passed through the double-cone processor to produce the macerated leaves.

The maceration is particularly effective if the maceration is performed on fresh leaves having not too high a moisture content. Thus it is preferred that the fresh leaves are partially dried to a moisture content of from 65 to 70% by weight prior to maceration.

Maceration is also most effective if the leaves are at a low temperature. Thus it is preferred that the fresh leaves are cooled to a temperature of from 5 to 40° C. prior to maceration.

Drying

Following maceration the leaves are dried. To allow for long-term storage stability, it is preferred that the leaves are dried to a moisture content of less than 30%, more preferably from 1 to 10% by weight of the leaves.

Suitable drying processes are known in the art and include tray drying. However, in a most preferred embodiment the drying step comprises drying the macerated leaves in a fluid bed dryer as this allows for more uniform heating and prevents the evolution of off-flavours and aromas due to burning. Drying with a fluid bed dryer also avoids scorching of the leaf surface. Scorching can result in poor infusion characteristics of the made tea, particularly in respect of the colour and clarity of the resulting beverage.

Sorting

The dried macerated leaves are preferably sorted according to particle size. In particular it is preferred that the leaves are sorted to recover those particles with a size larger than 30 mesh (595 µm), more preferably above 25 mesh (707 µm) and most preferably above 20 mesh (841 µm). Sorting may also involve recovering those particles with a particle size below 3 mesh (5.66 mm), more preferably below 4 mesh (4.76 mm) and most preferably below 5 mesh (4.00 mm). Suitably the step of sorting the leaves comprises sieving the dried macerated leaves.

EXAMPLES

The present invention will be further described with reference to the following examples.

Example 1

Fresh tea leaf (two leaves and a bud) from *Camellia sinensis* var. *assamica* was harvested from fields in Kenya. The fresh leaf has a moisture content of 76-80% by weight. The fresh leaf was then air-dried to a leaf moisture content of 75(±1)%. The leaf was then steamed for 60 seconds at a temperature of 96° C. to inactivate any endogenous enzymes and thus prevent fermentation.

The moisture content of the steamed leaves was then reduced to 67(±1)% by passing the leaf through two hot air drum driers in series followed by a vibratory bed hot air drier.

Leaf at the end of the vibratory bed was cooled to room temperature (~25° C.) and then fed to a rotorvane operating at 1500 kg/hour and with the iris opening set at 5.0 cm. Macerated leaf from the rotorvane was then split into two portions and each portion fed through a double-cone processor operating at 750 kg/hour. After the double-cone processing, the macerated leaf was dried in a fluid bed drier to a moisture content of below 3%.

Fibres and the secondaries were then removed from the tea leaf and the leaf sieved. The resulting sorted green leaf tea (sample A) had a size range of −5 +20 mesh and a content of catechins of 13.4% by weight.

The properties of the leaf tea were compared with a second leaf tea (sample B) prepared in an identical manner except that the macerated leaf from the rotorvane was passed through two CTC machines instead of the double-cone processor. The properties were also compared with those of a high quality commercial green leaf tea (sample C). The results are shown in Table 1.

TABLE 1

| Sample | Variety | Catechins (wt %) in Beverage* | Properties of Beverage* |
|---|---|---|---|
| A | Assamica | 0.072 | Pleasant taste, clear liquor |
| B | Assamica | 0.123 | Bitter taste, hazy liquor |
| C | Sinensis | 0.055 | Pleasant taste, clear liquor |

*Made by infusing 2 g of sample in 200 ml water for 2 mins at 90° C.

Example 2

A green leaf tea (sample D) was prepared from var. *assamica* using the method given for sample A detailed in Example 1. The properties of this leaf tea were compared with those of a commercial Japanese green tea (sample E). The results are shown in Tables 2 and 3.

TABLE 2

| | | Catechins | Composition of Beverage* (wt %) | | |
|---|---|---|---|---|---|
| Sample | Variety | (wt %) in Leaf | Catechins | Caffeine | Theanine |
| D | Assamica | 14.4 | 0.078 | 0.017 | 0.0088 |
| E | Sinensis | 11.4 | 0.077 | 0.017 | 0.0032 |

*Made by infusing 2 g of sample in 200 ml water for 1.5 mins at 90° C.

TABLE 3

| | | Colour of Beverage* | | | | | Haze of Beverage |
|---|---|---|---|---|---|---|---|
| Sample | Variety | L* | a* | b* | C* | h* | (NTU) |
| D | Assamica | 97.29 | −2.43 | 8.84 | 9.16 | 105.3 | 8.94 |
| E | Sinensis | 90.89 | −4.07 | 18.48 | 18.92 | 102.3 | 52.6 |

*Made by infusing 2 g of sample in 200 ml water for 1.5 mins at 90° C.

The invention claimed is:

1. A green leaf tea from *Camellia sinensis* var. *assamica*, at least 90% by weight of the green leaf tea has a particle size of −5 +20 mesh, and wherein the degree of damage to the leaf tea has been controlled to give an efficiency of catechin delivery of between 0.01 and 0.1%, and wherein the efficiency of catechin delivery is defined as the amount of catechins by weight of a beverage produced by infusion of 2 g of the leaf tea in 200 ml water for 1.5 minutes at 90° C.

2. A green leaf tea according to claim 1 wherein the catechin content of the green leaf tea is at least 11% by dry weight.

3. A green leaf tea according to claim 1, wherein the efficiency of catechin delivery is between 0.04 and 0.09% by weight of the beverage.

4. A green leaf tea according to claim 3, wherein the efficiency of catechin delivery is from 0.06 to 0.085%.

5. A green leaf tea according to claim 1 obtainable by a process comprising the steps of:
 (a) providing fresh tea leaves from the plant *Camellia sinensis* var. *assamica*; then
 (b) heat-treating the fresh leaves to arrest enzyme action; then
 (c) macerating the fresh leaves with a rotorvane and a double-cone processor, then
 (d) drying the macerated leaves; and then
 (e) optionally sorting the dried macerated leaves according to particle size.

6. A process for manufacturing a green leaf tea comprising the steps of:
   (a) providing fresh tea leaves from the plant *Camellia sinensis* var. *assamica*; then
   (b) heat-treating the fresh leaves to arrest enzyme action; then
   (c) macerating the fresh leaves with a rotorvane and a double-cone processor then
   (d) drying the macerated leaves; and then
   (e) optionally sorting the dried macerated leaves according to particle size
   wherein the dried macerated leaves are sorted in step (e) to recover particles with a particle size larger than about 20 mesh and below about 5 mesh.

7. A process according to claim 6 wherein the fresh leaves are macerated in step (c) by passing the fresh leaves through the rotorvane to produce partially macerated leaves and then passing the partially macerated leaves through the double-cone processor to produce the macerated leaves.

* * * * *